US007103115B2

(12) United States Patent
Li

(10) Patent No.: US 7,103,115 B2
(45) Date of Patent: Sep. 5, 2006

(54) OPTIMUM TRAINING SEQUENCES FOR WIRELESS SYSTEMS

(75) Inventor: Ye Li, Holmdel, NJ (US)

(73) Assignee: AT&T Corp., Bedminster, NJ (US)

( * ) Notice: Subject to any disclaimer, the term of this patent is extended or adjusted under 35 U.S.C. 154(b) by 667 days.

(21) Appl. No.: 09/862,755

(22) Filed: May 21, 2001

(65) Prior Publication Data

US 2003/0016621 A1  Jan. 23, 2003

(51) Int. Cl.
*H03D 1/00* (2006.01)
*H04L 27/06* (2006.01)

(52) U.S. Cl. .................. 375/340; 375/316; 455/216

(58) Field of Classification Search ................ 375/260, 375/267, 299, 340, 347, 316; 370/206, 208; 455/60, 63, 216
See application file for complete search history.

(56) References Cited

U.S. PATENT DOCUMENTS 6,298,035 B1 * 10/2001 Heiskala ..................... 370/206
6,421,327 B1 *  7/2002 Lundby et al. ............. 370/310
6,473,393 B1   10/2002 Lek et al.
6,611,551 B1 *  8/2003 Jones et al. ................. 375/219
6,842,442 B1 *  1/2005 Okawa et al. .............. 370/335

OTHER PUBLICATIONS

Wikipedia, Orthogonal Grequency Division Multiplexing, Characteristics, found Jan. 9, 2006, http://en.wikipedia.org/wiki/OFDM.*
Li, Y., "Optimum Training Sequences for OFDM Systems with Multiple Transmit Antennas," Globecom'00, IEEE Globasl Telelcommunication Conference, vol. 3 of 3, Nov. 27, 2000.
Li, et al., "Channel Estimation of OFDM Systems with Transmitter Diversity in Mobile Wireless Channels," IEEE Journal on Selected Areas in Communications, vol. 17, No. 3, Mar. 1999, 461.
Copy European Search Report dated Dec. 6, 2004 for corresponding European Patent Application No. 02253493.7.

* cited by examiner

*Primary Examiner*—Jean B. Corrielus
*Assistant Examiner*—Erin M. File

(57) ABSTRACT

In various embodiments, techniques are provided to determine channel characteristics of various communication systems such as OFDM systems or systems using a plurality of transmit antennas by using various sets of training symbols that produce zero cross-correlation energy. Channel communication can accordingly be simplified as the zero cross-correlation property allows for channel estimation without a matrix inversion.

2 Claims, 4 Drawing Sheets

OPTIMUM TRAINING SEQUENCES FOR WIRELESS SYSTEMS

BACKGROUND OF THE INVENTION

1. Field of Invention

This invention relates to channel estimation in wireless systems.

2. Description of Related Art

As wireless communications systems are deployed around the world, the importance of providing clear and cost-effective communication services increases. Unfortunately, providing clear communications can require mitigating various obstacles such as inter-symbol-interference (ISI). To reduce ISI, a technique known as orthogonal frequency division multiplexing (OFDM) can be used. Orthogonal frequency division multiplexing is a communication paradigm where a single communication channel is divided into many narrow sub-bands, which then can be transmitted in parallel. By transmitting symbols in this fashion, the duration of each symbol can be dramatically increased, which can greatly reduce or completely eliminate ISI problems.

Unfortunately, individual sub-bands within an OFDM transmission are subject to Rayleigh fading, especially when used in mobile communication systems. While the effects of Rayleigh fading can be mitigated by using multiple transmitter and/or receiver antennas, estimating the channel characteristics for all transmitter-receiver antenna pairs can be difficult and computationally intensive. Accordingly, there is a need for apparatus and techniques that provide for better channel estimation.

SUMMARY OF THE INVENTION

In various embodiments, techniques are provided to determine channel characteristics of various communication systems, such as OFDM systems or systems using a plurality of transmit antennas.

In a first embodiment, methods and apparatus for transmitting training symbols based on a set of first training symbols and one or more sets of second training symbols using one or more second communication channels is provided where a cross-correlation between the first set of training symbols and at least one of the sets of second training symbols is essentially zero.

In a second embodiment, methods and apparatus for channel estimation are provided by first receiving a first set of training symbols related to a first antenna and a set of second training symbols related to a second antenna and then estimating various communication channels. When the cross-correlation between the sets of training symbols is essentially zero, channel estimation can be achieved without a matrix inversion, thus simplifying channel estimation.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

This non-provisional application incorporates the substance of U.S. patent application Ser. No.09/861,811 entitled "CHANNEL ESTIMATION FOR WIRELESS SYSTEMS" to Ye LI. The above non-provisional application is concurrently filed and commonly assigned and hereby incorporated by reference in its entirety including all references cited therein.

For wireless systems, channel estimation can be difficult and computationally intensive. Generally, channel estimation for wireless systems can be performed by embedding a pattern of known symbols called training symbols within a transmitted signal and comparing the embedded training symbols against an expected pattern of training symbols at a receiver.

However, for communication systems such as orthogonal frequency division multiplexed (OFDM) systems having multiple sub-bands, each sub-band must be estimated, thus increasing computational requirements. When an OFDM communication system uses multiple transmit antennas and/or multiple receive antennas, each sub-band for each communication channel must be estimated, thus further increasing computational requirements. Fortunately, the problem of estimating the channel parameters for different sub-bands in an OFDM channel can be simplified based on the correlated nature of the sub-bands. Examples of such systems can be found in Yi, L., Seshardi, N. and Ariyavisitakul, S., "Channel estimation for OFDM systems with transmitter diversity in mobile wireless channels", *IEEE Journal of Selected Areas in Comm.*, Vol. 17, pp. 461–471 (March 1999) incorporated herein by reference in its entirety. Unfortunately, regardless of any advantages posed by intra-channel simplification for a single OFDM channel, the problem of estimating different OFDM channels remains.

However, in systems using multiple transmit antennas, by carefully choosing different patterns of training symbols such that each pattern of training symbols for any transmit antenna has zero cross-correlated energy with the training symbol pattern of any other transmit antenna, channel estimation can be greatly simplified. Such judicious choices of training symbols not only can reduce computational complexity, but also can provide the most accurate channel estimates possible.

Figure 1:
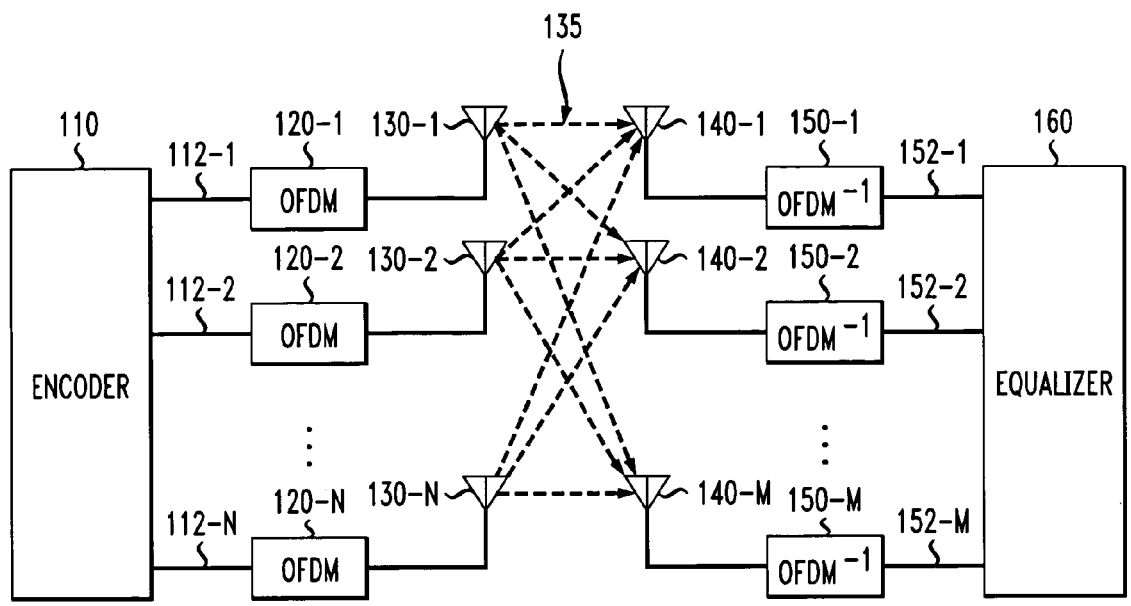
FIG. 1 is a block diagram of an exemplary communication system.

FIG. 1 is a block diagram of an exemplary transmission system 100. The transmission system 100 includes an encoder 110 having a number of associated OFDM transmitters 120-1, 120-2, . . . 120-N and respective transmit antennas 130-1, 130-2, . . . 130-N, and an equalizer 160 having a number of associated OFDM receivers 150-1, 150-2, . . . 150-M with respective receive antennas 140-1, 140-2, . . . 140-M.

In operation, the encoder 110 can form blocks of symbols that can be provided to the various OFDM transmitters 120-1, 120-2, . . . 120-N. The various OFDM transmitters 120-1, 120-2, . . . 120-N, in turn, can modulate the blocks of symbols into electromagnetic carriers such as radio-frequency waves that can then be transmitted using their respective transmitting antennas 130-1, 130-2, . . . 130-N. The various radio-frequency signals 135 can then be received by the receive antennas 140-1, 140-2, . . . 140-M and fed to their respective OFDM receivers 150-1, 150-2, . . . 150-M. The OFDM receivers 150-1, 150-2, . . . 150-M can then transform the received radio-frequency signals 135 into base-band signals, digitize the base-band signals and provide the digitized base-band signals to the equalizer 160. The equalizer 160, in turn, can extract the symbols from the digitized base-band signals and perform various operations on the symbols.

As shown in FIG. 1, the radio-frequency signals 135 transmitted by each transmit antenna 130-1, 130-2, . . . 130-N can be subsequently received by each of the receiving antennas 140-1, 140-2, . . . 140-M. While FIG. 1 depicts the various communication channels as single direct paths between each transmit/receive antenna pair, it should be appreciated that each radio-frequency signal 135 can propagate from each transmit antenna 130-1, 130-2, . . . 130-N to each receive antenna 140-1, 140-2, . . . 140-M not only through a direct path, but can also propagate from each transmit antenna 130-1, 130-2, . . . 130-N to each receive antenna 140-1, 140-2, . . . 140-M through a variety of indirect paths (not shown).

The various radio-frequency signal paths for a particular transmit/receive antenna pair can produce a complex communication channel, which can be distinctly different from any other communication channel defined by another transmit/receive antenna pair. Generally, the channel characteristics of an individual mobile wireless channel i.e., the impulse response, can be described by Eq. (1):

$$h(t, \tau) = \sum_k \gamma_k(t) c(\tau - \tau_k), \quad (1)$$

where $\tau_k$ is the delay of the k-th path, $\gamma_k(t)$ is the corresponding complex amplitude for the k-th path, and c(t) is the shaping pulse for the k-th path whose frequency response is usually a square-root raised cosine Nyquist filter. When a communication channel is a mobile wireless channel, the motion of a vehicle can affect the complex amplitudes $\gamma_k(t)$'s making each complex amplitude $\gamma_k(t)$ a wide-sense stationary (WSS), narrow-band complex Gaussian process that can be independent for different signal paths.

From Eq. (1), the frequency response H(t,f) of a communication channel at time t can be described by Eq. (2):

$$H(t, f) \triangleq \int_{-\infty}^{+\infty} h(t, \tau) \exp(-j2\pi f \tau) d\tau \quad (2)$$

or $$\triangleq C(f) \sum_k \gamma_k(t) \exp(-j2\pi f \tau_k) \quad (3)$$

where $$C(f) \triangleq \int_{-\infty}^{+\infty} c(\tau) \exp(-j2\pi f \tau_k). \quad (4)$$

For OFDM systems with proper cyclic extension and timing, the channel frequency response can be expressed by Eq.(5):

$$H[n, k] \triangleq H(nT_f, k\Delta f) = \sum_{l=0}^{K_o-1} h[n, l] W_K^{kl}, \quad (5)$$

where $h[n, l] \triangleq h(nT_f, kT_f/K)$, $W_K = \exp(-j2\pi/K)$, K is the number of sub-bands (tones) in an OFDM block, $T_f$ is the block length and $\Delta f$ is the sub-band (tone) spacing.

Following Eq. (5), the frequency response at the k-th tone of an n-th block of OFDM symbols corresponding to an i-th transmit antenna can be expressed by Eq.(6):

$$H_i[n, k] = \sum_{l=0}^{K_o-1} h_i[n, l] W_K^{kl}. \quad (6)$$

Equation (6) demonstrates that $H_i[n, k]$ can be obtained by estimating or otherwise acquiring $h_i[n, k]$. Accordingly, the received signal r[n, k] at each receive antenna 140-1, 140-2, . . . 140-M can be expressed by Eq. (7):

$$r[n, k] = \sum_{i=1}^{M} H_i[n, k] t_i[n, k] + w[n, k], \quad (7)$$

where M is the number of transmit antennas, k denotes a particular OFDM sub-band and k=0, 1, . . . , K−1 for all n blocks. If the transmitted signals $t_i[n, k]$'s from each transmit antenna contain known signals such as training symbols, the temporal estimation of the various communication channels $h_i[n, l]$'s can be derived using Eq. (8):

$$\begin{pmatrix} Q_{11}[n] & Q_{12}[n] & \cdots & Q_{1P}[n] \\ Q_{21}[n] & Q_{22}[n] & & \vdots \\ \vdots & & \ddots & \\ Q_{P1}[n] & \cdots & & Q_{PP}[n] \end{pmatrix} \begin{pmatrix} \tilde{h}_1[n] \\ \tilde{h}_2[n] \\ \vdots \\ \tilde{h}_P[n] \end{pmatrix} = \begin{pmatrix} p_1[n] \\ p_2[n] \\ \vdots \\ p_P[n] \end{pmatrix}, \quad (8)$$

or $$\begin{pmatrix} \tilde{h}_1[n] \\ \tilde{h}_2[n] \\ \vdots \\ \tilde{h}_P[n] \end{pmatrix} = \begin{pmatrix} Q_{11}[n] & Q_{12}[n] & \cdots & Q_{1P}[n] \\ Q_{21}[n] & Q_{22}[n] & & \vdots \\ \vdots & & \ddots & \\ Q_{P1}[n] & \cdots & & Q_{PP}[n] \end{pmatrix}^{-1} \begin{pmatrix} p_1[n] \\ p_2[n] \\ \vdots \\ p_P[n] \end{pmatrix}, \quad (9)$$

where $$\tilde{h}_i[n] \triangleq (\tilde{h}_i[n, 0] \ldots, \tilde{h}_i[n, K_o - 1])^T, \quad (10)$$

$$Q_{ij}[n] \triangleq (q_{ij}[n, i - j])_{i,j=1}^{K_o}, \quad (11)$$

and $$p_i[n] \triangleq (p_i[n, 0], \ldots, p_i[n, K_o - 1])^T, \quad (12)$$

where $\tilde{h}_i[n]$ is the estimated channel impulse response for the channel between an i-th transmit antenna and a particular receive antenna, $Q_{ij}[n]$ is a measure of the correlated energy between the set of training symbols $t_i[n, k]$ of an i-th transmit antenna and the set of training symbols $t_j[n, k]$ of a j-th transmit antenna and $p_i[n]$ is the cross-correlation vector between the set of training symbols $t_i[n, k]$ of an i-th transmit antenna and a received signal $r[n, k]$ at a particular receive antenna, and where:

$$q_{ij}[n, l] \triangleq \sum_{k=0}^{K-1} t_i[n, k] t_j^*[n, k] W_K^{-kl}, \quad (13)$$

and $$p_i[n, l] \triangleq \sum_{k=0}^{K-1} r[n, k] t_i^*[n, k] W_K^{-kl}. \quad (14)$$

Equation (13) provide a measure of the cross-correlation of energy between two sets of training symbols, i.e., a cross-correlation estimate, and Eq. (14) provides a similar measure between a particular set of training symbols and a received signal. While the particular cross-correlation estimates can be derived using Eqs. (13) and (14), it should be appreciated that any substantially accurate measure of correlation energy derived by any known or later developed means can be used without departing from the spirit and scope of the present invention.

From Eqs. (8) and (9), one can see that a matrix inversion is required to get the temporal estimation of each channel impulse response $h_i[n, k]$, i.e., $\tilde{H} = Q^{-1} P$.

Figure 2:
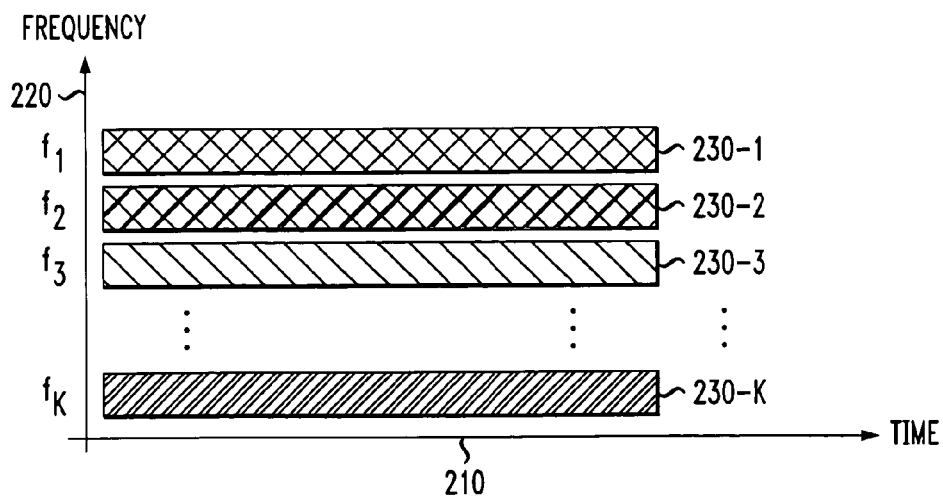
FIG. 2 depicts an OFDM signal having multiple sub-bands.
Figure 3:
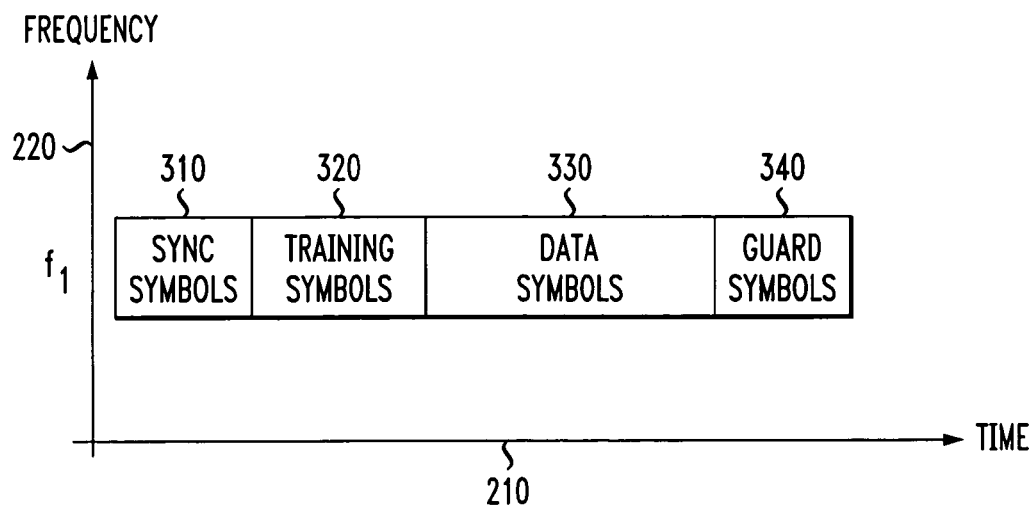
FIG. 3 depicts an exemplary communication signal of an OFDM sub-band.

FIG. 2 depicts an exemplary OFDM signal 200 displayed along a time axis 210 and against a frequency axis 220. As shown in FIG. 2, the OFDM signal 200 contains a number of individual sub-bands (tones) 230-1, 230-2, ... 230-K with each respective sub-band centered on a respective one of closely spaced frequencies $f_1, f_2, \ldots f_K$. FIG. 3 depicts an exemplary communication signal 300 capable of being embedded in the various sub-bands of FIG. 2. As shown in FIG. 3, the communication signal 300 contains a number of sync symbols 310, a number of training symbols 320, a number of data symbols 330 and a number of guard symbols 340.

Data symbols, also known as payload symbols, can contain information to be transmitted. Guard symbols are symbols that can pad either or both of the beginning and end of a burst transmission and can be used for a variety of purposes including providing buffering, timing and synchronization. Sync symbols are predetermined symbols placed at various strategic positions within a block of data that can allow a receiver to synchronize or otherwise extract timing information from a transmitted signal.

Training symbols, like sync symbols, can be predetermined symbols placed at known positions. However, unlike sync symbols, training symbols are usually configured to enable an equalizer to estimate a given communication channel. It should be appreciated that, in various exemplary embodiments, the training symbols 320 can be any set of symbols suitable for training an equalizer. For example, the exemplary training symbols 320 can be formed taking into account various factors such as their suitability for clock recovery, frequency-shift estimation, their peak-to-average ratio of signal strength or any other known or later recognized factor useful for generating an advantageous or otherwise adequate training sequence.

While the exemplary communication signal 300 is a burst signal with a particular form, it should be appreciated that the form of a burst signal can vary without departing from the spirit and scope of the present invention. For example, it should be appreciated that the training symbols 320 can be dispersed intermittently within the payload symbols 330. It should further be appreciated that while the exemplary communication signal 300 is a burst signal, the communication signal 300 can take various other forms such as a continuous signal in which various training symbols can be periodically embedded.

The exemplary communication signal 300 can be modulated according to a constant modulus scheme such as a quadrature amplitude modulated (QAM) scheme. However, it should be appreciated that the modulation scheme of the communication signal 300 can vary and can take the form of any known or later developed modulation scheme, such as BPSK, QPSK, OPSK, FSK, and the like, without departing from the spirit and scope of the present invention.

Figure 4:
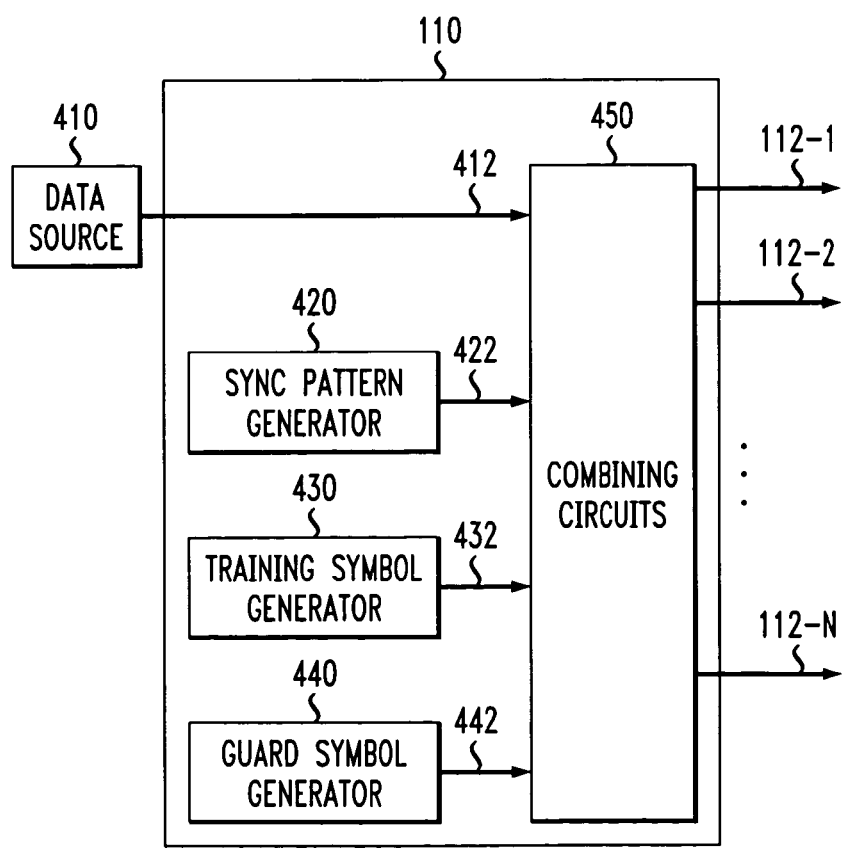
FIG. 4 is a block diagram of an exemplary OFDM encoder.

FIG. 4 is a block diagram of the exemplary OFDM encoder 110 of FIG. 1 with an associated data source 410. The OFDM encoder 110 includes a sync pattern generator 420, a training symbol generator 430, a guard symbol generator 440 and a number of combining circuits 450.

In operation, the combining circuits 450 can receive a stream of data (payload) symbols from the data source 410 via link 412 and arrange the data stream into a block of K separate sub-streams of data symbols such that each sub-stream of data symbols can be transmitted in a respective OFDM sub-band.

Next, the combining circuits 450 can receive a pattern of guard symbols from the guard symbol generator 440 and append the guard symbols to the end of each data sub-stream to produce a block of K sub-streams of data/guard symbols.

The combining circuits 450 then can replicate the block of data/guard symbol sub-streams N number of times, and retrieve N separate patterns of training symbols $\{T_1, T_2, \ldots T_N\}$ from the training symbol generator 430 via link 432. For each of the N blocks, the combining circuits 450 then can replicate each respective pattern of training symbols K number of times and insert the duplicate patterns of training symbols into each of the K separate sub-streams to form N blocks of training/data/guard symbol sub-streams with each of the N blocks having a different pattern of training symbols in each K sub-band.

While the exemplary combining circuits 450 inserts a single pattern of training symbols into each of the K sub-streams for a given block, it should be appreciated that in various embodiments, the training symbol generator 430 can provide K×M different patterns of training symbols such that the combining circuits 450 can assign each sub-stream of training/data/guard symbols a different pattern of training symbols. In still other embodiments, it should be appreciated that each of the N blocks can have a number of patterns of training symbols such that various sub-bands can share one of several available patterns of training symbols. For example, a given OFDM block having thirty-two sub-streams can receive two patterns of training symbols, replicate each pattern of training symbols sixteen times and assign each training symbol pattern to alternating sub-streams.

After each block of training/data/guard symbol sub-streams is formed, the combining circuits 450 can then receive a pattern of sync symbols from the sync pattern generator 420, replicate the sync symbols and append the various training/data/guard symbols to the sync symbols to produce N blocks of K sub-streams of sync/training/data/guard symbols.

While the exemplary OFDM encoder 110 can arrange various symbols to form finite blocks of symbols capable of being transmitted as bursts, it should be appreciated that, in various exemplary embodiments, the OFDM encoder can alternatively form K number of continuous streams of symbols having various training and data symbols, without departing from the spirit and scope of the present invention.

Figure 5:
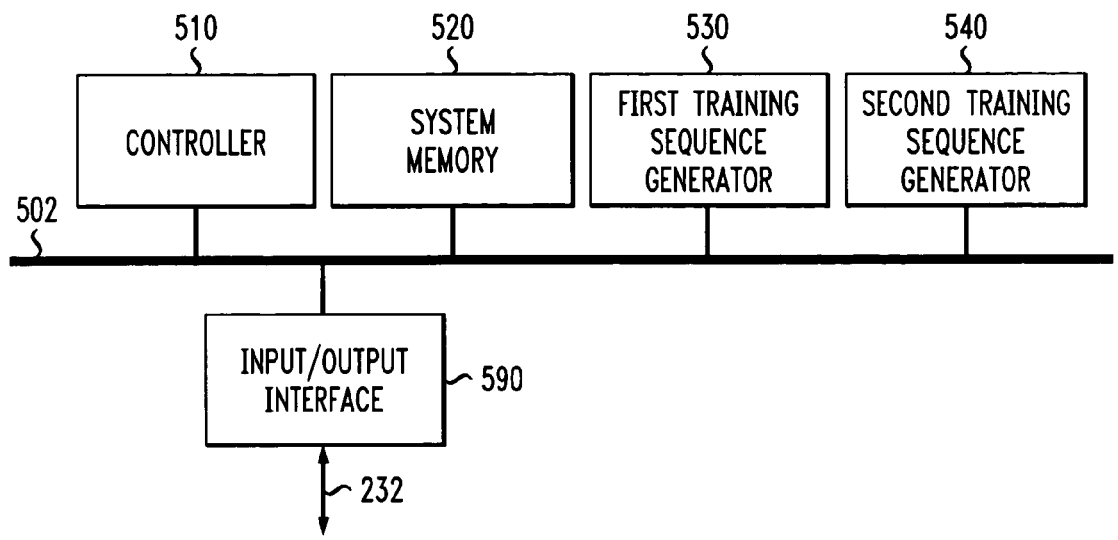
FIG. 5 is a block diagram of an exemplary training symbol generator.

FIG. 5 is a block diagram of the exemplary training symbol generator 430 of FIG. 4. The training symbol generator 430 has a controller 510, a system memory 520, a first training sequence generator 530, a second training sequence generator 540 and an input/output interface 590. The controller 510 interfaces with the various other components 520–590 using control/data bus 502. While the exemplary training symbol generator 430 is depicted as a bussed architecture, it should be appreciated that the functions of the various components 510–590 can be implemented using various other architectures such as complex circuits based on application specific integrated circuits, programmable logic devices, discrete logic and the like.

In operation, and under control of the controller 510, the input/output interface 590 can receive a command to provide N sets of training symbols relating to N separate transmit antennas via link 232 and store the command in the memory 520. In various exemplary embodiments, the input/output interface 590 can receive commands or other information from any device such as a wireless transmitter, a wire transmitter, an optical transmitter, a disc drive, a UART LAN, WAN, parallel digital interface, serial digital interface, software interface or any known or later developed combination of software and hardware without departing from the spirit and scope of the present invention.

After the controller 510 imports and stores the command, the controller 510 can direct the first training sequence generator 530 to generate a first set of training symbols $t_1[n, k]$ according to Eq. (15):

$$t_1[n,k] = \{S_0, S_1, S_2, \ldots S_{K-1}\}, \quad (15)$$

where each $S_i$ represents a valid symbol state. As discussed above, a set of training symbols such as $t_1[n, k]$ can be any sequence of symbols that is good or otherwise suitable for taking into account factors such as clock recovery, frequency-shift estimation, peak-to-average signal strength ratio or any other known or later recognized factor useful for generating an advantageous or otherwise adequate training sequence.

The first training sequence generator 530 can generate training symbols for communication systems having a constant-modulus signal such that the absolute value of any training sequence is equal to one ($|t_1[n, k]|=1$). However, it should be appreciated that, in other exemplary embodiments, the first training sequence generator 530 can generate training sequences applicable to any modulation format without departing from the spirit and scope of the present invention.

After the first training sequence generator 530 generates the first set of training symbols $t_1[n, k]$, the controller 510 can provide the first set of training symbols to the second training sequence generator 540. The second training sequence generator 540 can receive the first set of training symbols and generate subsequent sets of training symbols $t_i[n, k]$ where $i=2, 3, \ldots N$.

As discussed above, it can be desirable to generate OFDM training sequences such that the cross-correlated energy between any training sequences transmitted by different antennas is essentially zero, i.e., $Q_{ij}[n]=0$. Accordingly, the second training sequence generator 540 can generate a second training sequence $t_2[n, k]$ such that the cross-correlation energy between $t_1[n, k]$ and $t_2[n, k]$ is essentially zero, i.e., $Q_{12}[n]=0$. In various exemplary embodiments, such a training sequence $t_2[n, k]$ can be generated by replicating and phase-shifting the first training sequence $t_1[n, k]$ according to Eq. (16):

$$t_2[n, k] = t_1[n, k]\exp\left(-j\frac{2\pi k l_0}{K}\right) = t_1[n, k]W_K^{-kl_o}, \quad (16)$$

for some $l_o$ with $K_o \leq K - K_o$. Then it can be directly checked that $$q_{12}[n,l] = k\delta[l-l_o], \quad (17)$$

where $\delta[l]$ denotes the unit impulse function for a frequency $l$ and $l_o$ is a reference frequency. Eq. (17) implies that $q_{12}[u, l]=0$ for $|l| \leq K_o - 1$, and therefore $Q_{12}[n]=0$ and $Q_{21}[n]=Q_{12}^H[n]=0$.

After the second training sequence generator 540 generates the second training sequence $t_2[n, k]$, it can further generate various other training sequences $t_{3[n, k]}, t_4[n, k], \ldots t_N[n, k]$ based on the same principle of Eq.(16) such that $Q_{ij}[n]=Q_{ji}[n]=0$ for all $i \neq j$. Furthermore, like the first training sequence generator 530, the second training sequence generator 540 can generate $t_i[n, k]$'s such that ($|t_i[n, k]|=1$). In general, for communication systems having $N(N \leq K/K_o)$ transmit antennas, the second training sequence generator 540 can generate the remaining $N-1$ training sequences according to Eq.(18):

$$t_i[n, k] = t_1[n, k]W_K^{-K_o(i-1)k}, \quad (18)$$

where $$\overline{K}_o = \left\lfloor \frac{K}{N} \right\rfloor \geq K_o$$

and $\lfloor x \rfloor$ denotes the largest integer no larger than x. Then for two channels i and j where i<j, the correlation component $q_{ij}[n, \mathbf{l}]$ can be described by Eq.(19):

$$q_{ij}[n, l] = \sum_{k=0}^{K-1} t_i[n, k]t_j^*[n, k]W_K^{-kl}, \quad (19)$$

and by carefully selecting the relative phases between the training sequences for different transmit antennas, Eq. (9) above can be reduced to the form of Eq. (20) below:

$$\begin{pmatrix} \tilde{h}_1[n] \\ \tilde{h}_2[n] \\ \vdots \\ \tilde{h}_i[n] \end{pmatrix} = \begin{pmatrix} Q_{11}[0] & 0 & \cdots & 0 \\ 0 & Q_{22}[1] & & 0 \\ \vdots & & \ddots & \vdots \\ 0 & 0 & \cdots & Q_{ij}[n] \end{pmatrix}^{-1} \begin{pmatrix} p_1[n] \\ p_2[n] \\ \vdots \\ p_i[n] \end{pmatrix} \quad (20)$$

Because all off-axis elements of the Q matrix are essentially zero, determining the inverse matrix $Q^{-1}$ can be greatly simplified. Furthermore, for communication systems using a constant modulus modulation, i.e., $|t_i[n, k]|=1$, then Q in Eq.

(20) can be reduced to Q=K×I, for all i=1, 2, . . . N, and Eq. (20) can be further reduced to the form of Eq. (21):

$$\begin{pmatrix} \tilde{h}_1[n] \\ \tilde{h}_2[n] \\ \vdots \\ \tilde{h}_i[n] \end{pmatrix} = \begin{pmatrix} K & 0 & \cdots & 0 \\ 0 & K & & \vdots \\ \vdots & & \ddots & 0 \\ 0 & \cdots & 0 & K \end{pmatrix}^{-1} \begin{pmatrix} p_1[n] \\ p_2[n] \\ \vdots \\ p_i[n] \end{pmatrix}, \quad (21)$$

or $$\begin{pmatrix} \tilde{h}_1[n] \\ \tilde{h}_2[n] \\ \vdots \\ \tilde{h}_i[n] \end{pmatrix} = \frac{1}{K} \begin{pmatrix} 1 & 0 & \cdots & 0 \\ 0 & 1 & & \vdots \\ \vdots & & \ddots & 0 \\ 0 & \cdots & 0 & 1 \end{pmatrix} \begin{pmatrix} p_1[n] \\ p_2[n] \\ \vdots \\ p_i[n] \end{pmatrix} \quad (22)$$

Accordingly, the problem of determining the set of channel characteristics $H_i[n, 1]$ for a communication system having N transmit antennas can be reduced to solving Eq. (23):

$$h_i[n, l] = \frac{1}{K} p_i[n, l], \quad (23)$$

or alternatively $$h_i[n, l] = \frac{1}{K} p_i[n, l - (i-1)\overline{K}_o] \quad (24)$$

for $l=0, \ldots, \overline{K}_o-1$ and $i=1, 2 \ldots, N$. Therefore, by carefully selecting the relative phases between the training sequences for different transmit antennas, the timing sequences for each channel of each respective transmit antenna on $p_i[n, 1]$ are shifted to different regions in the time domain and the parameters for different channels can be easily estimated without using a computationally intensive matrix inversion.

As discussed above, for systems where every off-axis element of Q is exactly zero, i.e., $Q_{ij}[n]=Q_{ji}[n]=0$ for all $i \neq j$, it follows that $Q^{-1}$ can be directly replaced by $(1/K)I$. However, if one or more off-axis $Q_{ij}[n]$ are close to, but not exactly, zero, $Q^{-1}$ may still be approximated by $(1/K)I$. That is, it should be appreciated that, in various embodiments, $Q_{ij}[n]$ can be any value of $Q_{ij}[n]=Q_{ji}[n]\approx 0$ such that $Q^{-1}$ containing such $Q_{ij}[n]$ can still be functionally replaced with $(1/K)$ I, with an understanding that some performance degradation may occur.

A further advantage to designing the various sets of training symbols according to the above-described technique is that, when $Q_{ij}[n]=0$ for $i \neq j$ as in Eqs. (21) or (22), a channel estimator estimating the various channels can effectively attain the theoretical lower mean square error (MSE) boundary. Accordingly, such sets of training symbols can also enable an estimator to achieve the best theoretical performance.

While the above-described training symbol design technique can be applied to various OFDM systems, it should be appreciated that the above-identified technique can be applied to any other communication system using multiple transmit antennas. Furthermore, the training sequences developed above can be easily adapted to pilot sequence design for pilot symbol aided channel estimation or channel estimation in single carrier systems. For pilot symbol aided channel estimation in OFDM systems with pilot tones scattered into different times and frequencies, the pilot sequences can be described as two-dimensional and the optimum sequence design strategy can accordingly be directly used. Furthermore, the above-described approach can be more flexible than conventional approaches to pilot symbol aided channel estimation since the relative phases of the pilot sequences for different transmit antennas can be shifted in a two-dimensional claim.

Figure 6:
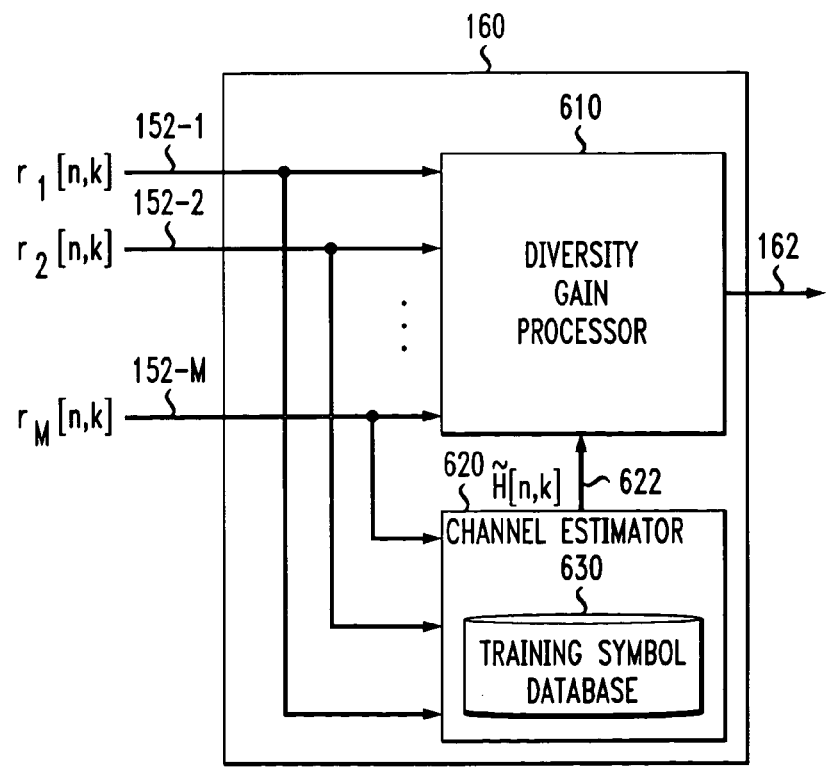
FIG. 6 is a block diagram of an equalizer with an exemplary channel estimator.

FIG. 6 is a block diagram of the exemplary equalizer 160 of FIG. 1. The exemplary equalizer 160 includes a diversity gain processor 610 and a channel estimator 620 containing a training symbol database 630.

In operation, the diversity gain processor 610 and channel estimator 620 can receive various received signals $r_1[n, k]$, $r_2[n, k], \ldots r_M[n, k]$ such as blocks of symbols from OFDM transmissions via links 152-1, 152-2, . . . 152-M. As discussed above, each of the received signals $r_i[n, k]$ can contain multiple transmit signals $t_i[n, k]$ according to Eq. (7) above transmitted by a plurality of transmit antennas, with each transmit signal $t_i[n, k]$ having an assortment of sync symbols, training symbols, data symbols and guard symbols, as well as any other symbol types. Also as discussed above, the training symbols embedded in the communication signals for each of the transmit signals $t_i[n, k]$ can be known symbol patterns and formed according to Eqs. (15)–(18) above such that there is essentially no cross-correlated energy between each set of training symbols, i.e. $Q_{ij}[n, 1]=0$ for all $i \neq j$.

During operation, channel estimator 620 can extract various sets of expected patterns of training symbols $t_i[n, k]$ from the training symbol database 630 and process each received signal $r_i[n, k]$ based on the technique described above in Eq. (14) above to derive $p_i[n, l]$, which can then be used to determine the various channel characteristics based on Eq. (18) or, in the case where a constant modulus modulation scheme is used, based on Eqs. (21)–(22).

After the channel estimator 620 determines the appropriate set of channel characteristics, the channel estimator 620 can export the set of channel characteristics to the diversity gain processor 610, which can use the set of channel characteristics to provide spatial and temporal equalization for the received signals to produce an estimated symbol stream that can be exported to an external device (not shown) via link 162.

The exemplary diversity gain processor 610 uses a minimum-mean-square-error (MMSE) technique to provide equalization. However, it should be appreciated that the diversity gain processor 610 can use any known or later developed technique useful for temporal and/or spatial equalization without departing from the spirit and scope of the present invention.

Figure 7:
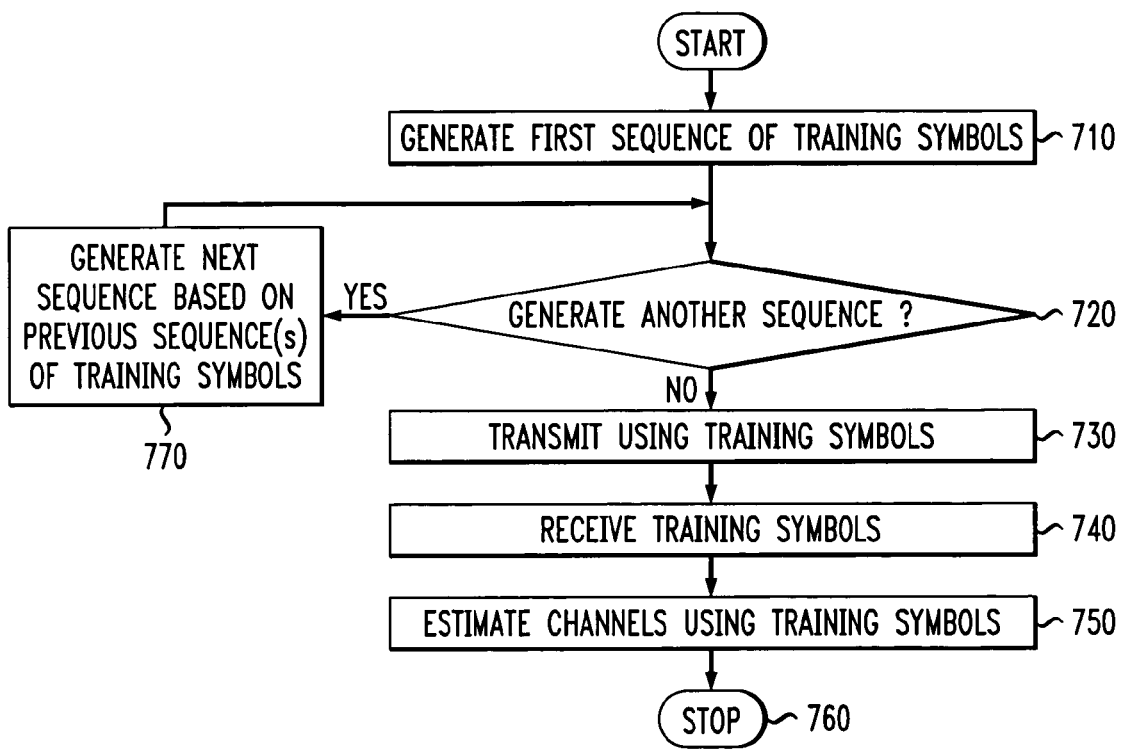
FIG. 7 is a flowchart outlining an exemplary technique for generating and communicating with sets of training symbols.

FIG. 7 is a flowchart outlining a first exemplary operation for developing and using optimum training sequences. The process starts in step 710 where a first set of training symbols is developed. As described above, the first set of training symbols can be any set of training symbols that is advantageous or otherwise good for characterizing a communication channel. Next, in step 720, a determination is made as to whether to generate another set of training symbols. If another set of training symbols is to be generated, control jumps to step 770; otherwise, control continues to step 730.

In step 770, a next set of training symbols is generated based on the first set of training symbols such that the cross-correlation energy between the first and second set of training symbols is essentially zero. Control then jumps back to step 720 where another determination is made as to whether to generate another set of training symbols. If more sets of training symbols are to be generated, step 770 is repeated such that each new set of training symbols generated will not appreciably have any cross-correlation energy with any of the previously generated sets of training symbols. The exemplary technique generates subsequent timing sequences by phase shifting the first time sequence according to Eqs. (13)–(16) above. However, it should be appreciated that, in various exemplary embodiments, the particular technique used to generate subsequent sets of training symbols can vary without departing from the spirit and scope of the present invention.

In step 730, because no further sets of training symbols are to be generated, the training sequences generated in step 710, 720 and 770 are transmitted. The exemplary sets of training symbols are transmitted according to an OFDM paradigm with the different sets of training symbols transmitted using different transmit antennas. However, as discussed above, it should be appreciated that the various sets of training symbols can be transmitted according to any other known or later developed paradigm using multiple transmit antennas and/or sub-bands without departing from the spirit and scope of the present invention.

Next, in step 740, the training symbols are received. While the exemplary technique uses multiple OFDM receivers coupled to an equalizer, it should be appreciated that the number of OFDM receivers can vary without departing from the spirit and scope of the present invention. Furthermore, as discussed above, while the exemplary receiver can operate according to an OFDM paradigm, it should be appreciated that the receiver can operate according to any other known or later developed paradigm without departing from the spirit and scope of the present invention.

Then, in step 750 the communication channels between the various transmit antennas and receive antennas can be estimated. As discussed above, the exemplary technique can estimate the various channels using a correlation matrix Q having all of the off-diagonal elements equal to zero to make the process of channel estimation extremely simple. Furthermore, as discussed above, in systems using a constant modulus modulation approach, the correlation matrix Q can be reduced to the identity matrix, thereby alleviating the necessity for performing an inverse transform altogether. Control then continues to step 760 where the operation stops.

As shown in FIG. 1–6, the systems and methods of this invention are preferably implemented on a digital signal processor (DSP) or other integrated circuits. However, the systems and methods can also be implemented using any combination of one or more general purpose computers, special purpose computers, program microprocessors or microcontroller and peripheral integrating circuit elements, hardware electronic or logic circuits such as application specific integrated circuits (ASICs), discrete element circuits, programmable logic devices such as PODs, POAs, FPGAs, PALs, or the like. In general, any device on which exists a finite state machine capable of implementing the various elements of FIGS. 1–6 and the flowchart of FIG. 7 can be used to implement the training sequence functions.

While this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the present invention.

What is claimed is:

1. An apparatus for communicating, comprising:
a first transmit device that transmits a set of first training symbols; and
a second transmit device that transmits a set of second training symbols;
wherein a cross-correlation estimate between the set of first training symbols and the set of second training symbols is essentially zero, whereby a channel estimation is achieved without performing a matrix inversion;
wherein the set of second training symbols is substantially identical to the set of first training symbols with a phase shift;
wherein the set of second training symbols is related to the set of first training symbols according to:

$$t_2[n,k]=t_1[n,k]W_K^{-kl_o},$$

where $t_1[n, K]$ is the set of first training symbols, $t_2[n, k]$ is the set of second training symbols and $$W_K^{-kl_o} = \exp\left(-j\frac{2\pi kl_0}{K}\right),$$

where n is an Orthogonal Frequency Division Multiplexing (OFDM) block, k is an OFDM sub-band, K is a total number of OFDM sub-bands and $l_o$ is a reference frequency.

2. An apparatus for communicating, comprising:
a receive device that receives at least a set of first training symbols transmitted by a first transmit device and a set of second training symbols transmitted by a second transmit device; and
an estimator that estimates at least a first channel related to the first transmit device based on at least the set of first training symbols;
wherein a cross-correlation estimate between the set of first training symbols and the set of second training symbols is essentially zero, whereby a channel estimation is achieved without performing a matrix inversion;
wherein the estimator further estimates the first channel based on at least the set of second training symbols;
wherein the estimator estimates the first channel without using a matrix inversion;
wherein the set of second training symbols is substantially identical to the set of first training symbols with a phase shift;
wherein the set of second training symbols is related to the set of first training symbols according to:

$$t_2[n,k]=t_1[n,k]W_K^{-kl_o},$$

where $t_1[n, k]$ is the set of first training symbols, $t_2[n, k]$ is the set of second training symbols and $$W_K^{-kl_o} = \exp\left(-j\frac{2\pi kl_0}{K}\right),$$

where n is an Orthogonal Frequency Division Multiplexing (OFDM) block, k is an OFOM sub-band, K is a total number of OFDM sub-bands and $l_o$ is a reference frequency.

* * * * *